(12) United States Patent
Cho et al.

(10) Patent No.: US 12,395,814 B2
(45) Date of Patent: Aug. 19, 2025

(54) ELECTRONIC DEVICE, AND METHOD FOR GROUPING EXTERNAL DEVICES BY SPACE IN ELECTRONIC DEVICE

(71) Applicant: SAMSUNG ELECTRONICS CO., LTD., Suwon-si (KR)

(72) Inventors: Hyungrae Cho, Suwon-si (KR); Jongtae Kim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/213,467

(22) Filed: Jun. 23, 2023

(65) Prior Publication Data

US 2023/0336945 A1 Oct. 19, 2023

Related U.S. Application Data

(63) Continuation of application No. PCT/KR2021/015857, filed on Nov. 4, 2021.

(30) Foreign Application Priority Data

Dec. 23, 2020 (KR) .................. 10-2020-0181506

(51) Int. Cl.
*H04W 4/33* (2018.01)
*G06T 7/521* (2017.01)
*H04W 4/02* (2018.01)

(52) U.S. Cl.
CPC ............. *H04W 4/026* (2013.01); *G06T 7/521* (2017.01); *H04W 4/33* (2018.02); *G06T 2207/10028* (2013.01)

(58) Field of Classification Search
None
See application file for complete search history.

(56) References Cited

U.S. PATENT DOCUMENTS 9,431,021 B1    8/2016  Scalise et al.
2011/0037712 A1 2/2011  Kim et al.
(Continued)

FOREIGN PATENT DOCUMENTS

KR    20150014618 A    2/2015
KR    20190025267 A    3/2019
(Continued)

OTHER PUBLICATIONS

International Search Report and Written Opinion for International Application No. PCT/KR2021/015857; International Filing Date Nov. 4, 2021; Date of Mailing Feb. 14, 2022; 9 Pages.
(Continued)

*Primary Examiner* — Junior O Mendoza
*Assistant Examiner* — Charles N Hicks
(74) *Attorney, Agent, or Firm* — CANTOR COLBURN LLP

(57) ABSTRACT

An electronic device includes a first communication module, a depth camera module, and a processor. The processor may be configured to: obtain distance information and direction information of a first external device by using the first communication module; and obtain first distance information between the electronic device and an object in a first space that distinguishes the first space from other spaces, by using the depth camera module, When it is identified that the first external device is located within a distance range indicating the first distance information, on the basis of the distance information and direction information of the first external device and the first distance information, the electronic device can identify that the first external device is located in the first space; and group the first external device as a device in the first space. Various other embodiments may be provided.

20 Claims, 13 Drawing Sheets

(56) References Cited

U.S. PATENT DOCUMENTS

| | | |
|---|---|---|
| 2014/0257532 A1 | 9/2014 | Kim et al. |
| 2016/0048576 A1 | 2/2016 | Yamaoka et al. |
| 2016/0174043 A1 | 6/2016 | Ko et al. |
| 2016/0224829 A1* | 8/2016 | Chou .................. G06T 7/11 |
| 2017/0091906 A1* | 3/2017 | Liang .................. G06T 7/11 |
| 2017/0135061 A1 | 5/2017 | Park et al. |
| 2018/0190014 A1 | 7/2018 | Yarborough et al. |
| 2018/0315162 A1 | 11/2018 | Sturm et al. |
| 2019/0340814 A1 | 11/2019 | Sinclair et al. |
| 2019/0387945 A1 | 12/2019 | Kim |
| 2020/0193994 A1 | 6/2020 | Ahn et al. |
| 2020/0242136 A1 | 7/2020 | Chambers et al. |
| 2022/0150417 A1* | 5/2022 | Bramlett .................. G06T 7/70 |
| 2022/0327737 A1* | 10/2022 | Wilhelm ................ G06V 20/64 |

FOREIGN PATENT DOCUMENTS

| | | |
|---|---|---|
| KR | 101976424 B1 | 5/2019 |
| KR | 20190098201 A | 8/2019 |
| KR | 20200029145 A | 3/2020 |
| WO | 2014081740 A1 | 5/2014 |

OTHER PUBLICATIONS

Korean Office Action corresponding to Application No. 10-2020-0181506, Dated Jun. 2, 2025.

* cited by examiner

ELECTRONIC DEVICE, AND METHOD FOR GROUPING EXTERNAL DEVICES BY SPACE IN ELECTRONIC DEVICE

CROSS-REFERENCE TO RELATED APPLICATION(S)

This application is a continuation application, claiming priority under § 365(c), of an International application No. PCT/KR2021/015857, filed on Nov. 4, 2021, which is based on and claims the benefit of a Korean patent application number 10-2020-0181506, filed on Dec. 23, 2020, in the Korean Intellectual Property Office, the disclosure of which is incorporated by reference herein in its entirety.

TECHNICAL FIELD

Various embodiments relate to an electronic device for grouping a plurality of external devices located in a home by space and a method of grouping external devices by space in the electronic device.

BACKGROUND ART

Internet of Things (IoT), which refers to a technology of connecting various external devices equipped with sensors and communication functions to the Internet, may provide monitoring and control functions for each of the external devices connected through the Internet.

DETAILED DESCRIPTION OF THE INVENTION

Technical Problem

Since an electronic device provides location information and control information about a plurality of external devices located in a closed area, home, building, spaces (e.g., rooms) in which the plurality of external devices are located in the closed area (e.g., home) may not be known intuitively.

Technical Solution

Various embodiments relate to an electronic device which may provide a home UI to a user by grouping a plurality of external devices located in a closed area (e.g., home) by space, and a method performed by the electronic device to group external devices in a home by space.

An electronic device according to various embodiments may include a first communication module, a depth camera module, and a processor. The processor may be configured to obtain distance information and direction information about a first external device using the first communication module, obtain first distance information between an object of a first space, which divides the first space from another space, and the electronic device using the depth camera module, and when identifying that the first external device is located within a distance range representing the first distance information based on the distance information and the direction information about the first external device and the first distance information, determine that the first external device is located in the first space, and group the first external device as a device in the first space.

According to various embodiments, a method of grouping external devices by space in an electronic device may include obtaining distance information and direction information about a first external device using a first communication module of the electronic device, obtaining first distance information between an object of a first space, which divides the first space from another space, and the electronic device using the depth camera module, and when it is identified that the first external device is located within a distance range representing the first distance information based on the distance information and the direction information about the first external device and the first distance information, determining that the first external device is located in the first space, and grouping the first external device as a device in the first space.

Advantageous Effects

According to various embodiments, as an electronic device provides a home UI on which a plurality of external devices located in a home are grouped by space, spaces (e.g., moms) in which the plurality of external devices are located in a home may be known intuitively.

MODE FOR CARRYING OUT THE INVENTION

Figure 1:
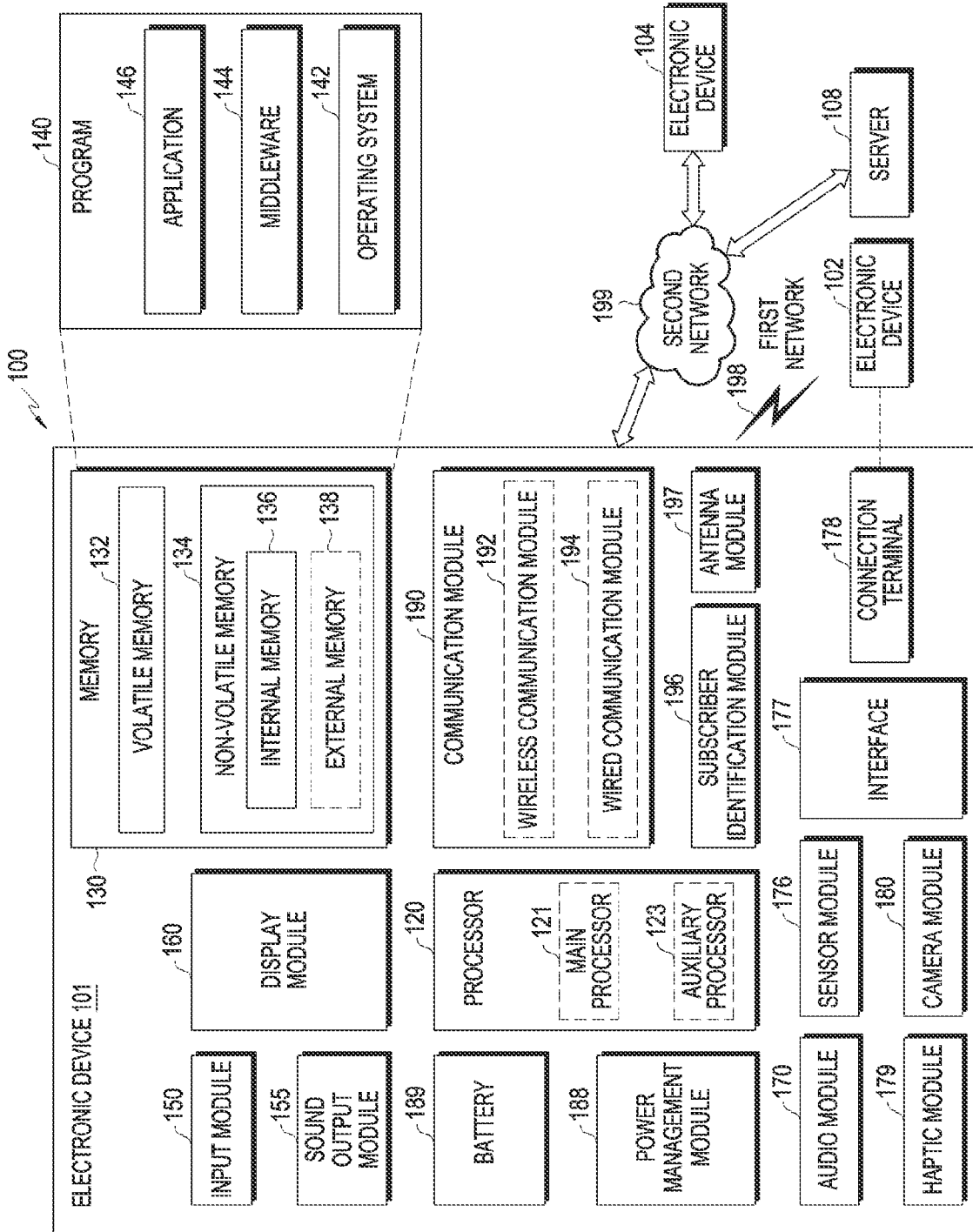
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module(SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 50 communication technology or IoT-related technology.

Figure 2:
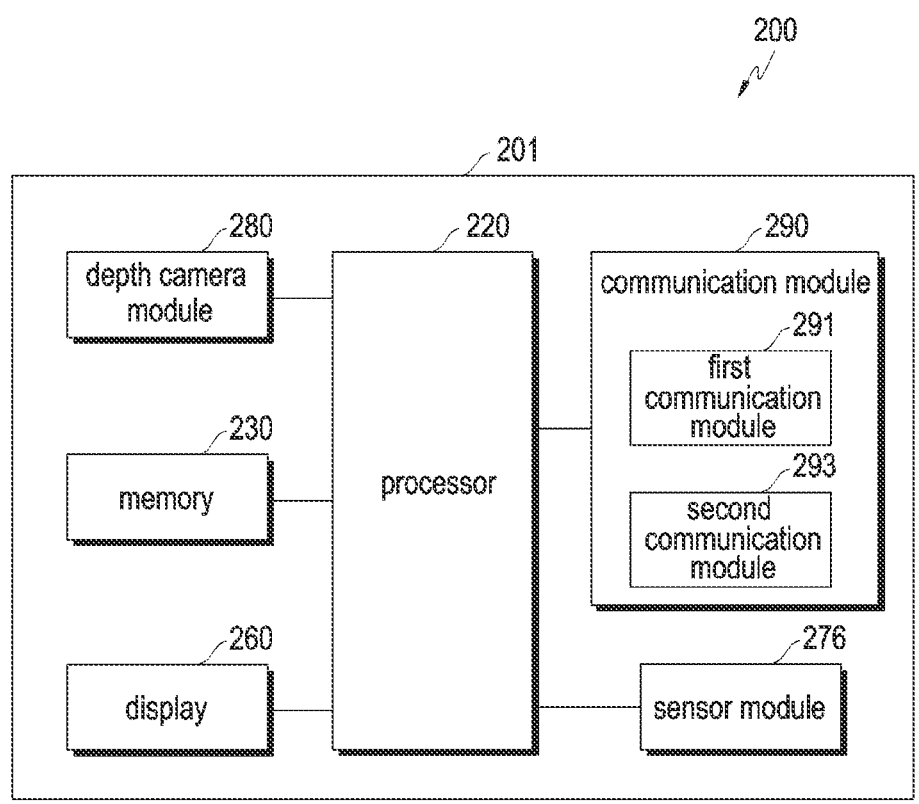
FIG. 2 is a block diagram illustrating an electronic device according to various embodiments.

FIG. 2 is a block diagram 200 illustrating an electronic device according to various embodiments.

Referring to FIG. 2, an electronic device 201 (e.g., the electronic device 101 of FIG. 1) may include a processor 220, memory 230, a display 260, a sensor module 276, a depth camera module 280, and/or a communication module 290.

According to various embodiments, the processor 220 may provide overall control to operations of the electronic device 201, and may be the same as the processor 120 of FIG. 1 or perform at least one function or operation performed by the processor 120.

According to various embodiments, the processor 220 may obtain location information about a first external device using a first communication module 291, identify first distance information between an object of a first space which divides the first space from another space and the electronic device 201 using the depth camera module 280, and when identifying that the first external device is located within a distance range representing the first distance information based on location information about the first external device and the first distance information, group the first external device as a device in the first space. The first space and one or more other spaces are described herein as being located in a closed area such as, for example, a home. It should be appreciated, however, that the spaces described herein can be located in other types of closed areas or dwellings such as a commercial building or a floor of a building without departing from the scope of the invention.

According to an embodiment, the processor 220 may obtain distance information and direction information about the first external device by calculating them based on ultra wideband (UWB) signals transmitted to and received from the first external device through the first communication module 291. The processor 220 may determine the distance information (e.g., ranging information) between the electronic device 201 and the first external device by calculating a time taken to transmit and receive UWB signals (e.g., a ranging request message and a ranging response message) between the electronic device 201 and the first external device using a UWB communication module which is the first communication module 291.

The processor 220 may receive ranging response signals from the first external device through a plurality of antennas for transmitting and receiving UWB signals, and determine the direction information (e.g., an arrival of angle (AOA)) about the first external device using the difference of a first reception time of a ranging response signal received through a first antenna among the plurality of antennas and a second reception time of a ranging response signal received through a second antenna among the plurality of antennas.

According to an embodiment, when the depth camera module 280 captures the object (e.g., wall) of the first space that divides the first space from another space, the processor 220 may obtain the first distance information between the object (e.g., wall) of the first space and the electronic device 201 using, for example, a time of flight (ToF) method or a light detection and ranging (LiDar) method.

The processor 220 may obtain the first distance information between the object (e.g., wall) of the first space and the electronic device 201 using the depth camera module 280 that captures the first space, and calculate a current position of the object (e.g., wall) of the first space spaced apart from a current position of the electronic device 201 by the first distance information based on the obtained first distance information. The processor 220 may obtain size information about the object (e.g., wall) of the first space using the depth camera module 280 that captures the first space.

The processor 220 may identify whether the first external device is located within the distance range representing the first distance information from the position of the electronic device 201 to the position of the object (e.g., wall) of the first space based on the distance information and direction information about the first external device.

According to an embodiment, when identifying that the first external device is not located within the distance range representing the first distance information based on the distance information and direction information about the first external device and the first distance information between the object (e.g., wall) of the first space and the electronic device 201, the processor 220 may not group the first external device as a device in the first space, determining that the first external device is located outside the first space.

According to various embodiments, when identifying that the first external device is located in the first space based on location information about an external device obtained using the depth camera module 280 that captures the first space and location information about the first external device obtained using the first communication module 291, the processor 220 may group the first external device as a device in the first space.

According to an embodiment, when the location information about the external device obtained using the depth camera module 280 is identical to the location information about the first external device, the processor 220 may identify that the first external device is located in the first space and group the first external device as a device in the first space.

According to an embodiment, the processor may obtain the location information about the external device obtained using the depth camera module 280 in a second coordinate system (e.g., a spherical coordinate system (r, θ, Φ). In the at least one second coordinate system, a distance may be obtained using the depth camera module 280, an azimuth angle θ may be obtained using a gyro sensor included in the sensor module 276, and a zenith angle Φ may be obtained using an acceleration sensor included in the sensor module 276.

According to an embodiment, the processor 220 may obtain the location information about the first external device into a first coordinate system (e.g., a Cartesian coordinate system (x, y, z)) using a scanning operation of the first communication module 291. The processor 220 may convert the first coordinate system (e.g., the Cartesian coordinate system (x, y, z)) representing the location information about the first external device to the second coordinate system (e.g., the spherical coordinate system (r, θ, Φ)) by <Equation 1> below and compare the location information about the first external device with the location information about the external device obtained using the depth camera module 280.

$$r = \sqrt{x^2 + y^2 + z^2}, \; \theta = \tan^{-1}\frac{\sqrt{x^2 + y^2}}{z}, \; \Phi = \tan^{-1}\frac{y}{z} \quad \text{[Equation 1]}$$

According to various embodiments, when the processor 220 has detected the external device using the depth camera module 280 that captures the first space and has failed in detecting the first external device using the first communication module 291 (e.g., the first communication module is not included in the electronic device or the first communication module is inactive), the processor 220 may group the external device obtained using the depth camera module 280 as a device in the first space according to a user selection.

According to an embodiment, the processor 220 may inquire whether to group the external device as a device in the first space, while providing an image of the external device obtained using the depth camera module 280. When the user agrees to group the external device as a device in the first space, the processor 220 may group the external device as a device in the first space.

According to various embodiments, in the case where the processor 220 has detected the first external device using the first communication module 291 and has failed in detecting the external device using the depth camera module 280 that captures the first space, when identifying that the first external device is located within the azimuth angle range associated with the first space and the first distance information between the object of the first space and the electronic device 201, the processor 220 may group the first external device as a device in the first space, determining that the first external device is located in the first space.

According to an embodiment, while the processor 220 captures the first space using the depth camera module 280, the processor 220 may obtain an azimuth angle azimuth angle (e.g., 0 θ-150 θ) of the first space including a capturing direction of the electronic device toward the first space from the direction of magnetic north using the sensor 276. The processor 220 may obtain an azimuth angle θ of the first external device by converting the first coordinate system (e.g., the Cartesian coordinate system (x, y, z)) representing the location information about the first external device to the second coordinate system (e.g., the spherical coordinate system (r, θ, Φ)) by <Equation 1'>. The processor 220 may identify whether the azimuth angle θ of the first external device is included in the azimuth angle range (e.g., 0 θ to 150 θ) of the first external device by comparing the azimuth angle θ of the first external device with the azimuth angle range (e.g., 0 θ to 150 θ) of the first space.

According to an embodiment, the processor 220 may obtain the first distance information (e.g., r=100) between the object (e.g., the wall) of the first space and the electronic device 201 using the depth camera module 280 that captures the first space.

When a plurality of objects (e.g., walls) exist within the azimuth angle range (e.g., 0 θ to 150 θ) of the first space, the processor 220 may obtain a plurality of pieces of first distance information representing distance ranges between the respective objects and the electronic device 201 based on capturing of the first space using the depth camera module 280. For example, in the case where three walls dividing the first space from other spaces are captured using the depth camera module, when the processor 220 is capable of obtaining three pieces of first distance information representing distance ranges between the respective walls and the electronic device 210, the azimuth angle of the first space may be divided into three azimuth angles according to the three distance ranges.

The processor 220 may identify whether the first external device is located within the first distance information (e.g. r=100) between the object of the first space and the electronic device 201 based on the distance information about the first external device obtained through the first communication module.

According to an embodiment, when the azimuth angle of the first external device is not included in the azimuth angle of the first space, the processor 220 may not group the first external device as a device in the first space, identifying that the first external device is located outside the first space.

According to an embodiment, when identifying that the first external device is not located within the first distance information between the object of the first space and the electronic device 201 based on the distance information about the first external device, the processor 220 may not group the first external device as a device in the first space, determining that the first external device is located outside the first space.

According to various embodiments, the processor 220 may generate <Table 1> below as a device table including location information about an external device obtained using the depth camera module 280 that captures the first space, location information about a first external device obtained using the first communication module 290, device type information, azimuth angle information, and distance information, and store <Table 1> in the memory 230.

TABLE 1

| Type of external electronic device | Location information obtained by first communication module | Location information obtained by depth camera module | Device type | Azimuth angle (θ) | Distance information (r) |
|---|---|---|---|---|---|
| 1 | $(X_1, Y_1, Z_1)$ | $(r_1, \theta_1, \Phi_1)$ | Cam | 12 | 50 |
| 2 | $(X_2, Y_2, Z_2)$ | $(r_2, \theta_2, \Phi_2)$ | TV | 78 | 95 |

TABLE 1-continued

| Type of external electronic device | Location information obtained by first communication module | Location information obtained by depth camera module | Device type | Azimuth angle (θ) | Distance information (r) |
|---|---|---|---|---|---|
| 3 | $(X_3, Y_3, Z_3)$ | $(r_3, \theta_3, \Phi_3)$ | Air-conditioner | 89 | 85 |
| 4 | $(X_4, Y_4, Z_4)$ | $(r_4, \theta_4, \Phi_4)$ | Bulb | 104 | 95 |
| 5 | $(X_5, Y_5, Z_5)$ | | Speaker | 80 | 50 |
| 6 | | $(r_6, \theta_6, \Phi_6)$ | Bulb Stand | | |
| 7 | $(X_7, Y_7, Z_7)$ | | F-Hub | 230 | 90 |
| 8 | $(X_8, Y_8, Z_8)$ | | Multi-purpose sensor | 140 | 150 |

According to an example, the location information obtained by the first communication module 291 and location information obtained by the depth camera module 280 are identical for each of external device 1 to external device 4 based on <Table 1> above. Accordingly, the processor 220 may identify that external device 1 to external device 4 are located in the first space and group external device 1 to external device 4 as devices in the first space. According to an example, external device 5 may be a device that is not detected when the first space is captured using the depth camera module 280, because it is hidden by another object in the first space. As a result, the processor 220 identifies for external device 5 that only location information obtained by the first communication module 291 exist without location information obtained by the depth camera module 280, for external device 5. However, the processor determiners for external device 5 that its azimuth angle range (e.g., 104 θ) is included in the azimuth angle range (e.g., 0 θ to 150 θ) of the first space, and distance information (e.g., r=50) about external device 5 is included in the first distance information (e.g., r=100) between the object of the first space and the electronic device 201 based on <Table 1> above. Accordingly, the processor 220 may identify that external device 5 is located in the first space and group external device 5 as a device in the first space.

According to an example, external device 6 may be detected during capturing of the first space using the depth camera module 280, when the electronic device 201 does not include the first communication module 291 or the first communication module 291 is inactive. Accordingly, when only location information obtained by the depth camera module 280 exists without location information obtained by the first communication module 291, for external device 6 based on <able 1> above, the processor 220 may group external device 6 as a device in the first space according to a user selection.

According to an example, external device 7 may be an external device located outside the first space, for example, in a right space. As location information obtained by the first communication module 291 exists without location information obtained using capturing of the depth camera module 280, for external device 7, distance information (e.g., r=90) about external device 7 is identified as included in second distance information (e.g., r=100) between the object of the first space and the electronic device 201, and the azimuth angle (e.g., 230 θ) of external device 7 is not included in the azimuth angle range (e.g., 0 θ to 150 θ) of the first space based on <Table 1> above, the processor 220 may not group external device 7 as a device in the first space, identifying that external device 7 is located outside the first space.

According to an example, external device 8 may be an external device located outside the first space, for example, in a rear space. As location information obtained by the first communication module 291 exists without location information obtained using capturing of the depth camera module 280, for external device 8, the azimuth angle (e.g., 140 θ) of external device 8 is included in the azimuth angle range (e.g., 0 θ to 150 θ) of the first space, and distance information (e.g., r=150) about external device 8 is identified as not included in the first distance information (e.g., r=100) between the object of the first space and the electronic device 201, the processor 220 may not group external device 8 as a device in the first space, identifying that external device 8 is located outside the first space.

According to various embodiments, the memory 230 may be implemented substantially the same as or similar to the memory 130 of FIG. 1.

According to an embodiment, the memory 230 may store a device table including location information about at least one external device obtained using the depth camera module 280 that captures the first space, location information about each of first external devices obtained using the first communication module 290, device type information, azimuth angle information, and distance information.

According to various embodiments, the display 260 may be implemented substantially the same as or similar to the display module 160 of FIG. 1.

According to an embodiment, the display 260 may display a user interface (UI) on which a plurality of devices are grouped by space in a closed area such as, for example, a home.

According to various embodiments, the depth camera module 280 may be implemented substantially the same as or similar to the camera module 180 of FIG. 1, and include at least one camera located on a front surface and at least one camera located on a rear surface.

According to an embodiment, the depth camera module 280 may include a ToF camera module or a depth vision LiDar camera module.

According to various embodiments, the communication module 290 may be implemented substantially the same as or similar to the communication module 190 of FIG. 1, and include a plurality of communication circuits using different communication technologies, including the communication module 290.

According to an embodiment, the communication module 290 may include the first communication module 291 and a second communication module 293.

According to an embodiment, the first communication module (communication module 291) may include a UWB communication module capable of transmitting and receiving UWB signals to and from an external device using a plurality of antennas for UWB communication.

According to an embodiment, the second communication module 293 may include at least one of a wireless LAN module (not shown) or a short-range communication module (not shown), and the short-range communication module (not shown) may include a Wi-Fi module, an NFC communication module, a Bluetooth legacy communication module, and/or a BLE communication module.

Figure 3A:
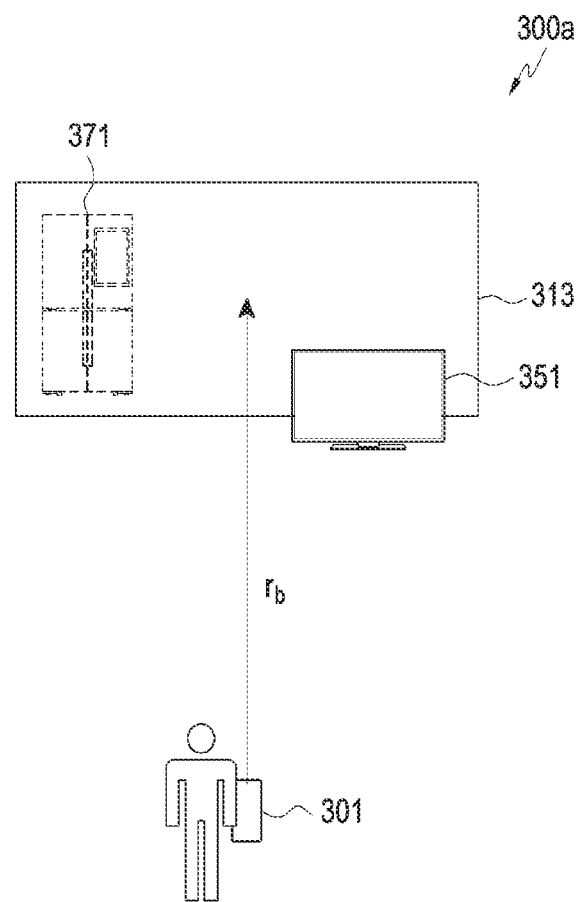
FIGS. 3a and 3b are diagrams referred to for describing an operation of grouping external devices by space in an electronic device according to various embodiments.
Figure 3B:
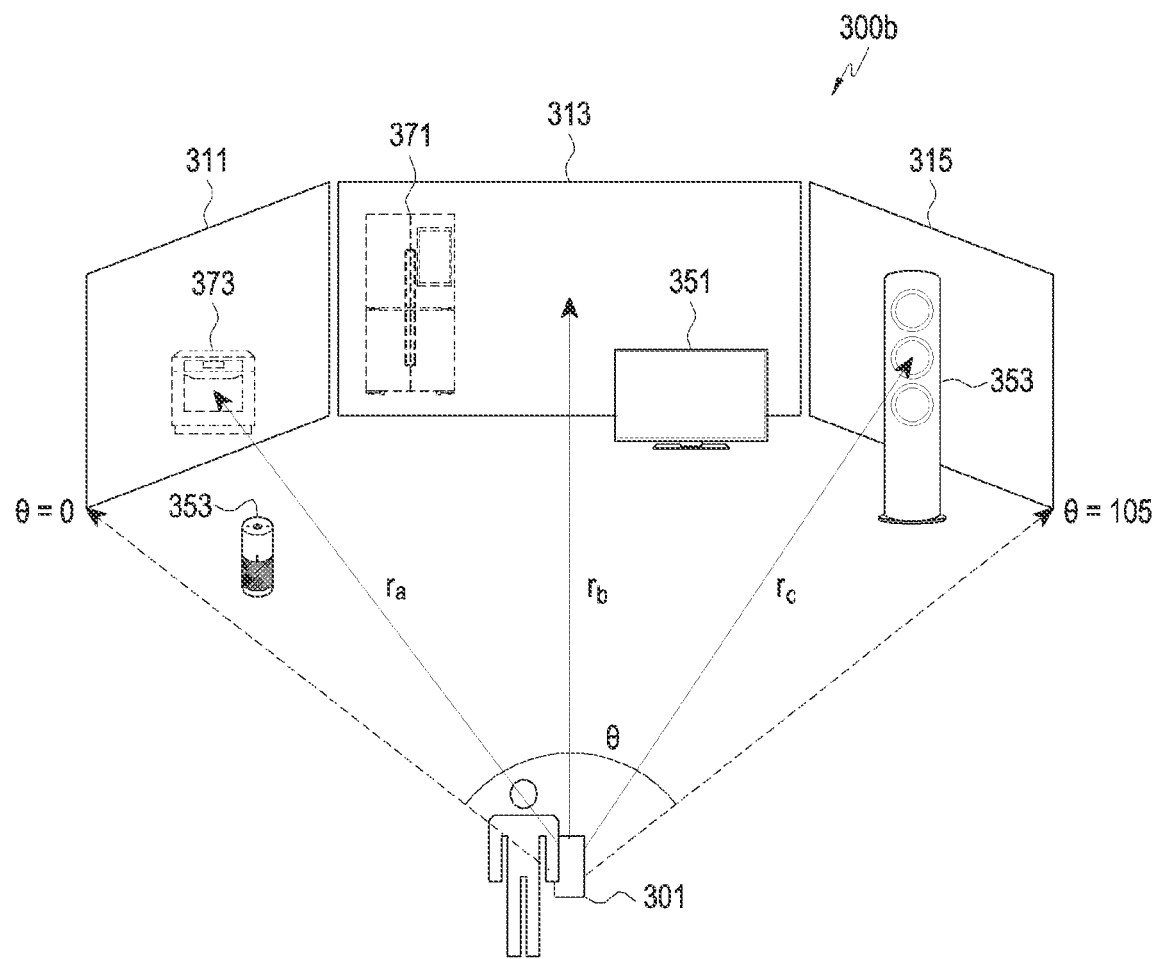

FIGS. 3a and 3b are diagrams 300a and 300b referred to for describing an operation of grouping external devices by space in an electronic device according to various embodiments.

Referring to FIG. 3a, an electronic device 301 (e.g., the electronic device 101 of FIG. 1 or the electronic device 201 of FIG. 2) may obtain first distance information $r_b$ between the electronic device 301 and an object (e.g., wall) 313 in a first space (e.g., room), while capturing the object 313 in the first space using a depth camera module (e.g., the depth camera module 280).

The electronic device 301 may obtain the first distance information $r_b$ between the object (e.g., wall) of the first space captured by the depth camera module and the electronic device 301, and calculate a current position of the object 313 spaced apart from a current position of the electronic device 301 by the first distance information based on the first distance information $r_b$. The electronic device 301 may obtain size information about the object (e.g., wall) of the first space using the depth camera module that captures the first space. The electronic device 301 may identify whether a first external device 351 is located within a distance range representing the first distance information $r_b$ between the position of the electronic device 301 and the object (e.g., wall) located in the first space.

The electronic device 301 may obtain distance information and direction information about a first external device 351 and distance information and direction information about a second external device 371, using UWB signals transmitted and received through a UWB communication module that is a first communication module (e.g., the first communication module 291 of FIG. 2).

When identifying that the external device 351 is located within the distance range representing the first distance information between the object 313 of the first space and the electronic device 301 based on the distance information and direction information about the external device 351, the electronic device 301 may group the external device 351 as a device in the first space.

When identifying that the external device 371 is not located within the distance range representing the first distance information between the object 313 of the first space and the electronic device 301 based on the distance information and direction information about the external device 371, the electronic device 301 may not group the external device 371 as a device in the first space.

Referring to FIG. 3b, the electronic device 301 (e.g., the electronic device 101 of FIG. 1 or the electronic device 201 of FIG. 2) may obtain first distance information $r_a$, $r_b$, and $r_c$ between the electronic device 301 and a plurality of objects (e.g., walls) 311 to 315 of a first space (e.g., room), while capturing the plurality of objects (e.g., walls) 311 to 315 of the first space using a depth camera module (e.g., the depth camera module 280).

The electronic device 301 may obtain the azimuth angle range (e.g., 0 θ to 150 θ) of the first space based on sensor information received from a sensor module (e.g., the sensor module 276 of FIG. 2), while capturing the plurality of objects (e.g., walls) 311 to 315 of the first space using the depth camera module.

The electronic device 301 may obtain first distance information $r_a$ between a first object (e.g., wall) 311 of the first space and the electronic device 301, first distance information $r_b$ between a second object (e.g., wall) 313 and the electronic device 301, and first distance information $r_c$ between a third object (e.g., wall) 315 and the electronic device 301, using the depth camera module, and divide the azimuth angle of the first space into three azimuth angles based on the three pieces of first distance information $r_a$, $r_b$, and $r_c$.

The electronic device 3.01 may generate <Table 1> described above, including location information about each of a plurality of external devices 351, 353, 371, and 373, device type information, azimuth angle information, and distance information, using a first communication module (e.g., the first communication module 291 of FIG. 2) and capturing of the depth camera module.

When identifying that the plurality of external devices 351 to 353 are located within a azimuth angle range (e.g., 0 θ to 150 θ) of the first space and distance ranges representing the first distance information $r_a$, $r_b$, and $r_c$ between the plurality of objects 311 to 315 in the first space and the electronic device 301 based on the location information, azimuth angle information, and distance information about the plurality of external devices 351 to 353, the electronic device 301 may group the plurality of external devices 351 to 353 as devices in the first space.

When identifying that the plurality of external devices 351 to 353 are not located within the azimuth angle range (e.g., 0 θ to 150 θ) of the first space and distance ranges representing the first distance information $r_a$, $r_b$, and $r_c$ between the plurality of objects 311 to 315 in the first space and the electronic device 301 based on the location information, azimuth angle information, and distance information about the plurality of external devices 351 to 353, the electronic device 301 may not group the plurality of external devices 351 to 353 as devices in the first space.

Figure 4A:
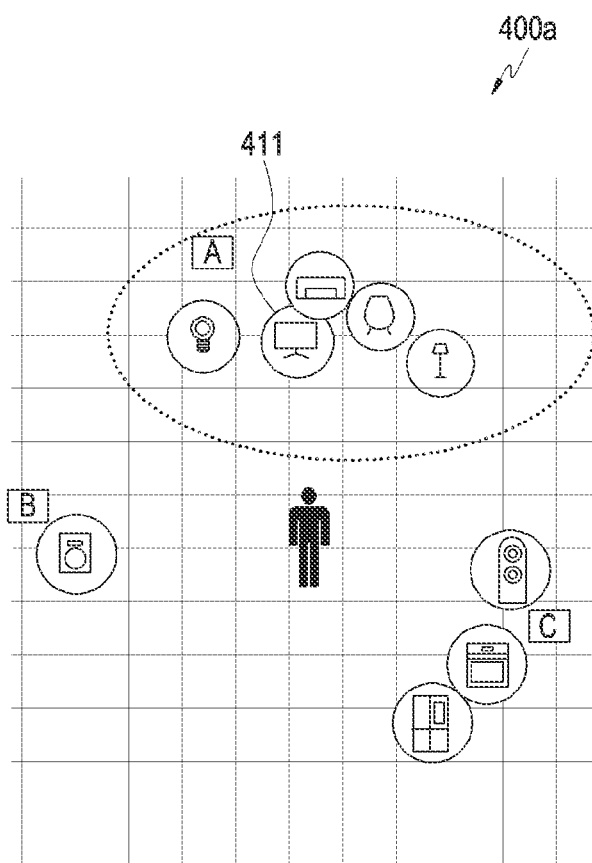
FIGS. 4a and 4b are diagrams referred to for describing provision of a home UI on which external devices are grouped by space in an electronic device according to various embodiments.
Figure 4B:
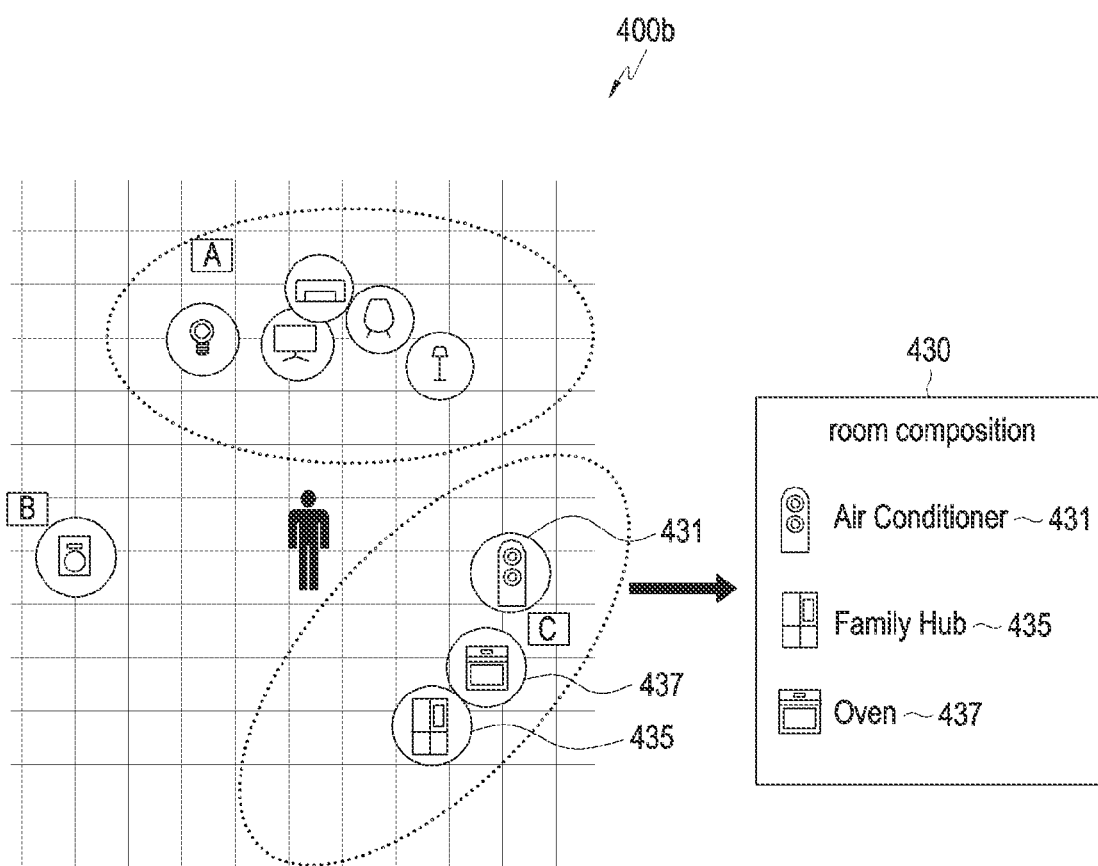

FIGS. 4a and 4b are diagrams 400a and 400b referred to for describing provision of a home UI display by an electronic device, which external devices are grouped by space according to various embodiments. Although the spaces are described as being located in a home, it should be appreciated that the spaces can be included in other types of closed area (e.g., a commercial building) without departing from the scope of the invention.

As illustrated in FIG. 4a, in a state where a home is divided into a first space A, a second space B, and a third space C by objects (e.g., walls), an electronic device (e.g., the electronic device 101 of FIG. 1, the electronic device 201 of FIG. 2, or the electronic device 301 of FIGS. 3a and 3b) may group a plurality of external devices located in the home by space (e.g., room) using a depth camera module (e.g., the depth camera module 280 of FIG. 2) and a first communication module (e.g., the first communication module 291 of FIG. 1) and provide a home UI on which the plurality of external devices are grouped by space in the home. When an external device located in a specific space is selected while the home UI is provided through a display (e.g., the display 260 of FIG. 2) of the electronic device, information about the selected external device and information for controlling the selected external device may be output. For example, when a TV device 411 in the space A is selected, information about the TV device 411 and information for controlling the TV device may be output.

While the home UI is provided through the display (e.g., the display 260 of FIG. 2) of the electronic device, external devices grouped into the specific space may be moved to another space and groups accordingly according to a user selection. For example, the electronic device may move the TV device 411 in the space A to the space C according to a user selection and group it accordingly.

As illustrated in FIG. 4b, when a specific space is selected (e.g., via touchscreen input) while the electronic device provides a home UI indicating a plurality of external devices grouped by space in a home through the display (e.g., the display 260 of FIG. 2) of the electronic device, the electronic device may output information about a plurality of external devices grouped into the selected specific space. For example, upon selection of a space C, the electronic device may display a plurality of external devices grouped into the space C, such as an air conditioner 431, a refrigerator 435, and an oven 437 in a pop-up window 430. Upon selection (e.g., via touchscreen input) of one of the plurality of external devices included in the pop-up window, the electronic device may output detailed information about the selected external device.

According to various embodiments, an electronic device (e.g., the electronic device 101 of FIG. 1, the electronic device 201 of FIG. 2, or the electronic device 301 of FIGS. 3a and 3b) may include a first communication module (e.g., the communication module 291 of FIG. 2), a depth camera module (e.g., the depth camera module 280 of FIG. 2), and a processor (e.g., the processor 120 of FIG. 1 or the processor 220 of FIG. 2). The processor may be configured to obtain distance information and direction information about a first external device using the first communication module, obtain first distance information between an object of a first space, which divides the first space from another space, and the electronic device using the depth camera module, and when identifying that the first external device is located within a distance range representing the first distance information based on the distance information and the direction information about the first external device and the first distance information, identify that the first external device is located in the first space, and group the first external device as a device in the first space.

According to various embodiments, the processor may be configured to, when identifying that the first external device is not located within the distance range representing the first distance information based on the distance information and the direction information about the first external device and the first distance information, to identify that the first external device is located outside the first space and not group the first external device as a device in the first space.

According to various embodiments, the processor may be configured to calculate the distance information and the direction information about the first external device based on a signal transmitted to and received from the first external device through the first communication module.

According to various embodiments, the processor may be configured to, when location information about an external device obtained using the depth camera module capturing the first space is identical to location information about the first external device obtained using the first communication module, identify that the first external device is located in the first space, and group the first external device as a device in the first space.

According to various embodiments, the processor may be configured to obtain the location information about the external device in a second coordinate system using the depth camera module, obtain the location information about the first external device in a first coordinate system using the first communication module, and identify whether the location information about the external device is identical to the location information about the first external device by converting the location information about the first external device obtained in the first coordinate system into the second coordinate system.

According to various embodiments, the processor may be configured to, when an external device is detected using the depth camera module capturing the first space, and the first external device is not detected using the first communication module, identify that the external device detected using the depth camera module is located in the first space and group the first electronic device as a device in the first space, according to a user selection.

According to various embodiments, the processor may be configured to, when the first external device is detected using the first communication module, and an external device is not detected using the depth camera module capturing the first space, if identifying that the first external device is located within an azimuth angle range of the first space and the distance range representing the first distance information, identify that the first external device is located in the first space, and group the first external device as a device in the first space.

According to various embodiments, the processor may be configured to obtain an azimuth angle of the first space using a sensor module (e.g., the sensor module 176 of FIG. 1 or the sensor module 276 of FIG. 2) included in the electronic device.

According to various embodiments, the processor may be configured to obtain location information about the external device in a second coordinate system using the depth camera module, obtain location information about the first external device in a first coordinate system using the first communication module, convert the location information about the first external device obtained in the first coordinate system into the second coordinate system, obtain an azimuth angle of the first external device from the location information about the first external device converted into the second coordinate system, and identify whether the first external device is located within an azimuth angle range of the first space based on the azimuth angle of the first external device and the azimuth angle range of the first space.

According to various embodiments, the processor may be configured to, when identifying that the first external device is not included within the azimuth angle range of the first space or not located within the distance range representing the first distance information, identify that the first external device is located outside the first space.

Figure 5:
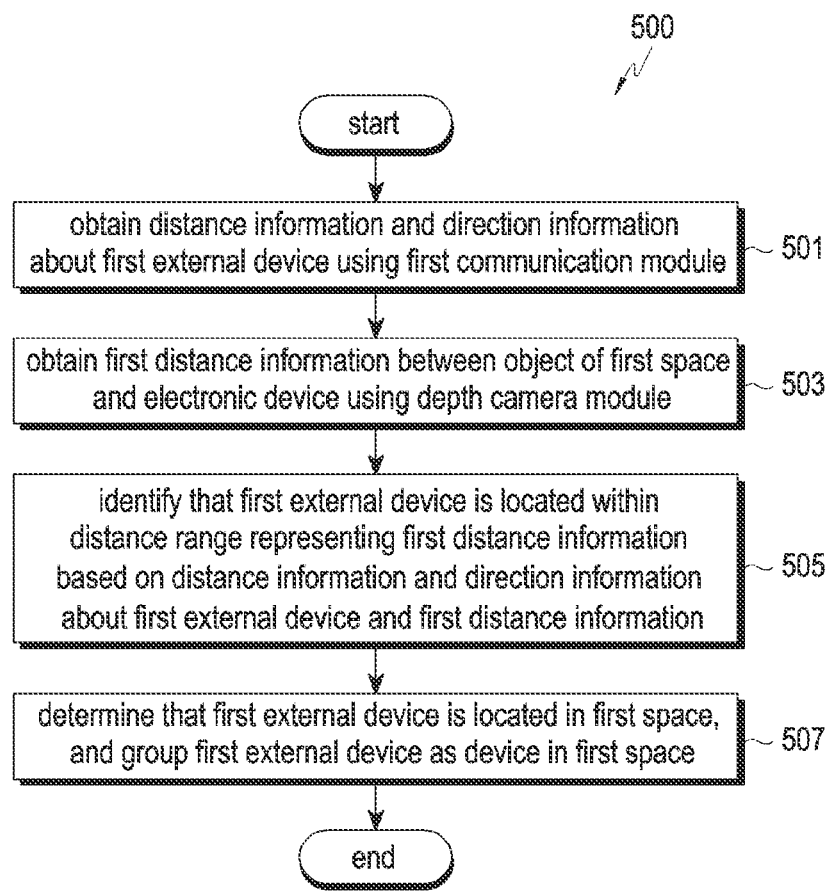
FIG. 5 is a flowchart illustrating an operation of grouping external devices by space in an electronic device according to various embodiments.

FIG. 5 is a flowchart 500 illustrating an operation of grouping external devices by space in an electronic device according to various embodiments. The operation of grouping external devices by space may include operations 501 to 507. According to an embodiment, at least one of operations 501 to 507 may be omitted, the order of some operations may be changed, or another operation may be added.

In operation 501, the electronic device (e.g., the electronic device 101 of FIG. 1, the electronic device 201 of FIG. 2, or the electronic device 301 of FIGS. 3a and 3b), may obtain distance information and direction information about a first external device using a first communication module (e.g., the first communication module 291 of FIG. 2).

According to an embodiment, the electronic device may calculate the distance information and direction information about the first external device using UWB signals transmitted and received to and from the first external device, using a UWB communication module that is the first communication module.

In operation 503, the electronic device (e.g., the electronic device 101 of FIG. 1, the electronic device 201 of FIG. 2, or the electronic device 301 of FIGS. 3a and 3b) may obtain first distance information between an object of a first space and the electronic device using a depth camera module (e.g., the depth camera module 280 of 2).

According to an embodiment, when the electronic device captures an object (e.g., wall) of the first space, which divides the first space from other spaces, the electronic device may obtain first distance information between the object (e.g., wall) of the first space and the electronic device using a ToF method or a LiDar method.

According to an embodiment, the electronic device may obtain the first distance information between the object (e.g., wall) of the first space and the electronic device using the depth camera module that captures the first space, and calculate a current position of the object (e.g., wall) spaced apart from a current position of the electronic device by the first distance information based on the obtained first distance information. The electronic device may obtain a distance range representing the first distance information from the position of the electronic device to the position of the object (e.g., wall) of the first space.

In operation 505, the electronic device (e.g., the electronic device 101 of FIG. 1, the electronic device 201 of FIG. 2, or the electronic device 301 of FIGS. 3a and 3b) may identify that the first external device is located within the distance range representing the first distance information based on the distance information and direction information about the first external device and the first distance information.

In operation 507, the electronic device (e.g., the electronic device 101 of FIG. 1, the electronic device 201 of FIG. 2, or the electronic device 301 of FIGS. 3a and 3b) may determine that the first external device is located in the first space, and group the first external device as a device in the first space.

According to an embodiment, when identifying that the first external device is not located within the distance range representing the first distance information based on the distance information and direction information about the first external device and the first distance information, the electronic device may not group the first external device as a device in the first space.

Figure 6:
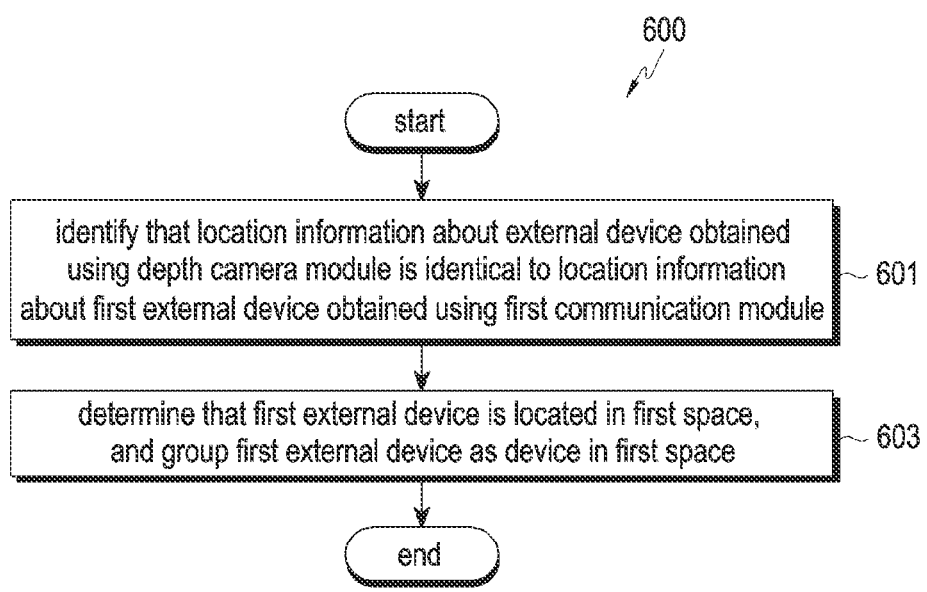
FIG. 6 is a flowchart illustrating an operation of grouping external devices by space in an electronic device according to various embodiments.

FIG. 6 is a flowchart 600 illustrating an operation of grouping external devices by space in an electronic device according to various embodiments. The operation of grouping the external devices by space may include operations 601 and 603. According to an embodiment, at least one of operation 601 or operation 603 may be omitted, the order of some operations may be changed, or another operation may be added.

In operation 601, the electronic device (e.g., the electronic device 101 of FIG. 1, the electronic device 201 of FIG. 2, or the electronic device 301 of FIGS. 3a and 3b) may identify that location information about an external device obtained using a depth camera module (e.g., the depth camera module 280 of FIG. 2) is identical to location information about a first external device obtained using a first communication module (e.g., the first communication module 293 of FIG. 1).

According to an embodiment, the electronic device may capture a first space using the depth camera module, obtain location information about an external device located in the first space based on capturing of the external device, and obtain the obtained location information about the external device in a second coordinate system (e.g., a spherical coordinate system (r, θ, Φ)).

According to an embodiment, the electronic device may obtain location information about the first external device in a first coordinate system (e.g., a Cartesian coordinate system (x, y, z)) based on a scan operation of the first communication module. The electronic device may convert the first coordinate system (e.g., the Cartesian coordinate system (x, y, z)) representing the location information about the first external device to a second coordinate system (e.g., a spherical coordinate system surface (r, θ, Φ)) by <Equation 1> and compare the location information about the first external device with the location information about the external device obtained using the depth camera module 280.

In operation 603, the electronic device (e.g., the electronic device 101 of FIG. 1, the electronic device 201 of FIG. 2, or the electronic device 301 of FIGS. 3a and 3b) may determine that the first external device is located in the first space, and group the first external device as a device in the first space.

According to an embodiment, the electronic device may group a first external device (e.g., external device 1 to external device 4) for which location information obtained using the depth camera module and location information obtained using the first communication module are identical among a plurality of external devices included in a device table as a device in the first device based on the device table stored in the memory (e.g., the memory 230 of FIG. 2).

According to an embodiment, when the location information about the external device obtained using the depth camera module and the location information about the first external device obtained using the first communication module are not identical, the electronic device may identify that the first external device is located outside the first space, and may not group the first external device as a device in the first space.

Figure 7:
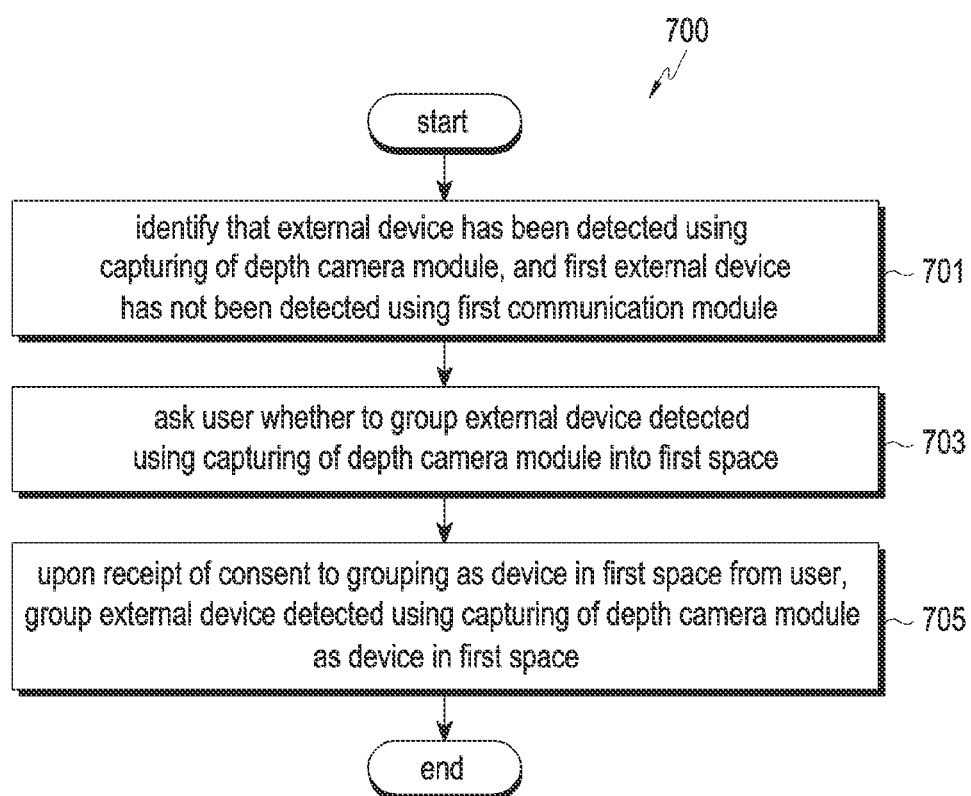
FIG. 7 is a flowchart illustrating an operation of grouping external devices by space in an electronic device according to various embodiments.

FIG. 7 is a flowchart 700 illustrating an operation of grouping external devices by space in an electronic device according to various embodiments. The operation of grouping external devices by space may include operations 701 to 705. According to an embodiment, at least one of operations 701 to 705 may be omitted, the order of some operations may be changed, or another operation may be added.

In operation 701, the electronic device (e.g., the electronic device 101 of FIG. 1, the electronic device 201 of FIG. 2, or the electronic device 301 of FIGS. 3a and 3b) may identify that an external device has been detected using capturing of a depth camera module (e.g., the depth camera module 280 of 2), and a first external device has not been detected using a first communication module (e.g., the first communication module 293 of FIG. 1).

According to an embodiment, the electronic device may capture a first space using the depth camera module, and an external device located in the first space may be detected based on capturing of the external device.

According to an embodiment, when the electronic device does not include a UWB communication module, which is the first communication module, or the UWB communication module is inactive, the first external device may not be detected using the UWB communication module.

In operation 703, the electronic device (e.g., the electronic device 101 of FIG. 1, the electronic device 201 of FIG. 2, or the electronic device 301 of FIGS. 3a and 3b) may ask a user whether to group the external device detected using the depth camera module (e.g., the depth camera module 280 of FIG. 2) as a device in the first space.

According to an embodiment, the electronic device may ask the user whether to group the external device as a device of the first space, together with an image and information about the external device detected using capturing of the depth camera module.

In operation 705, upon receipt of consent to grouping the external device as a device in the first space from the user, the electronic device (e.g., the electronic device 101 of FIG. 1, the electronic device 201 of FIG. 2, or the electronic device 301 of FIGS. 3a and 3b) may group the external device detected using capturing of the depth camera module (e.g., the depth camera module 280 of FIG. 2) as a device in the first space.

According to an embodiment, the electronic device may group an external device (e.g., external device 6) that has been detected using capturing of the depth camera module although not detected using the first communication module among the plurality of external devices included in the device table stored in the memory (e.g., the memory 230 of FIG. 2), as a device in the first space based on the device table according to a user selection.

According to an embodiment, when receiving non-consent from the user for grouping as a device in the first space, the electronic device may not group the external device detected using capturing of the depth camera module as a device in the first space.

Figure 8:
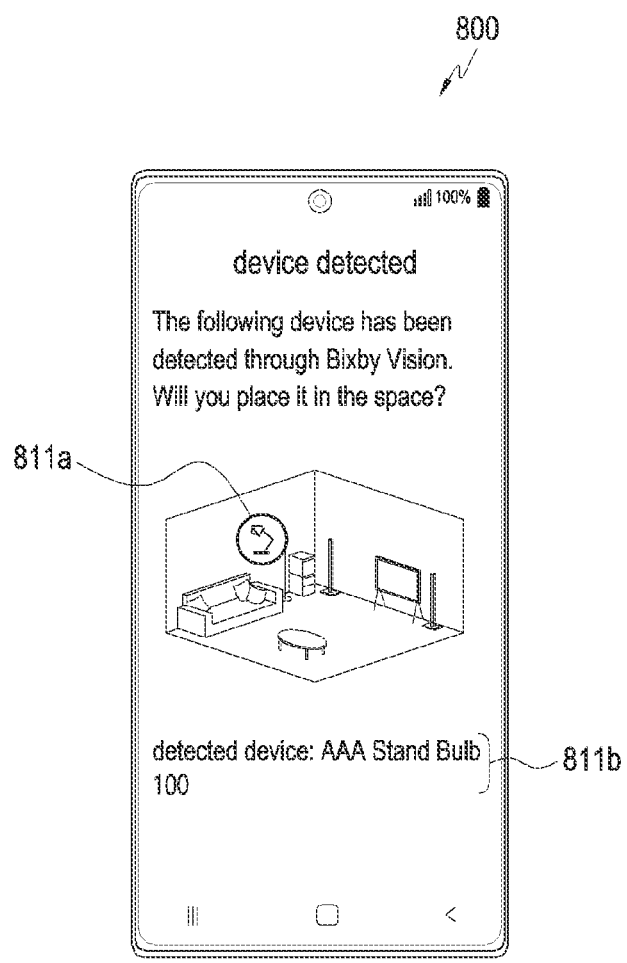
FIG. 8 is a diagram referred to for describing an operation of asking for consent from a user, when external devices are grouped by space in an electronic device according to various embodiments.

FIG. 8 is a diagram 800 referred to for describing an operation of asking for consent from a user, when external devices are grouped by space in an electronic device according to various embodiments.

As illustrated in FIG. 8, when an external device has been detected using capturing of a depth camera module (e.g., the depth camera module 280 of FIG. 2), and a first external device has not been detected using a first communication module (e.g., the first communication module 293 of FIG. 1), the electronic device (e.g., the electronic device 101 of FIG. 1, the electronic device 201 of FIG. 2, or the electronic device 201 of FIGS. 3a and 3b) may ask for consent to grouping the external device into the first space, together with an image 811a and information 811b about the detected external device based on the capturing of the depth camera module.

Figure 9:
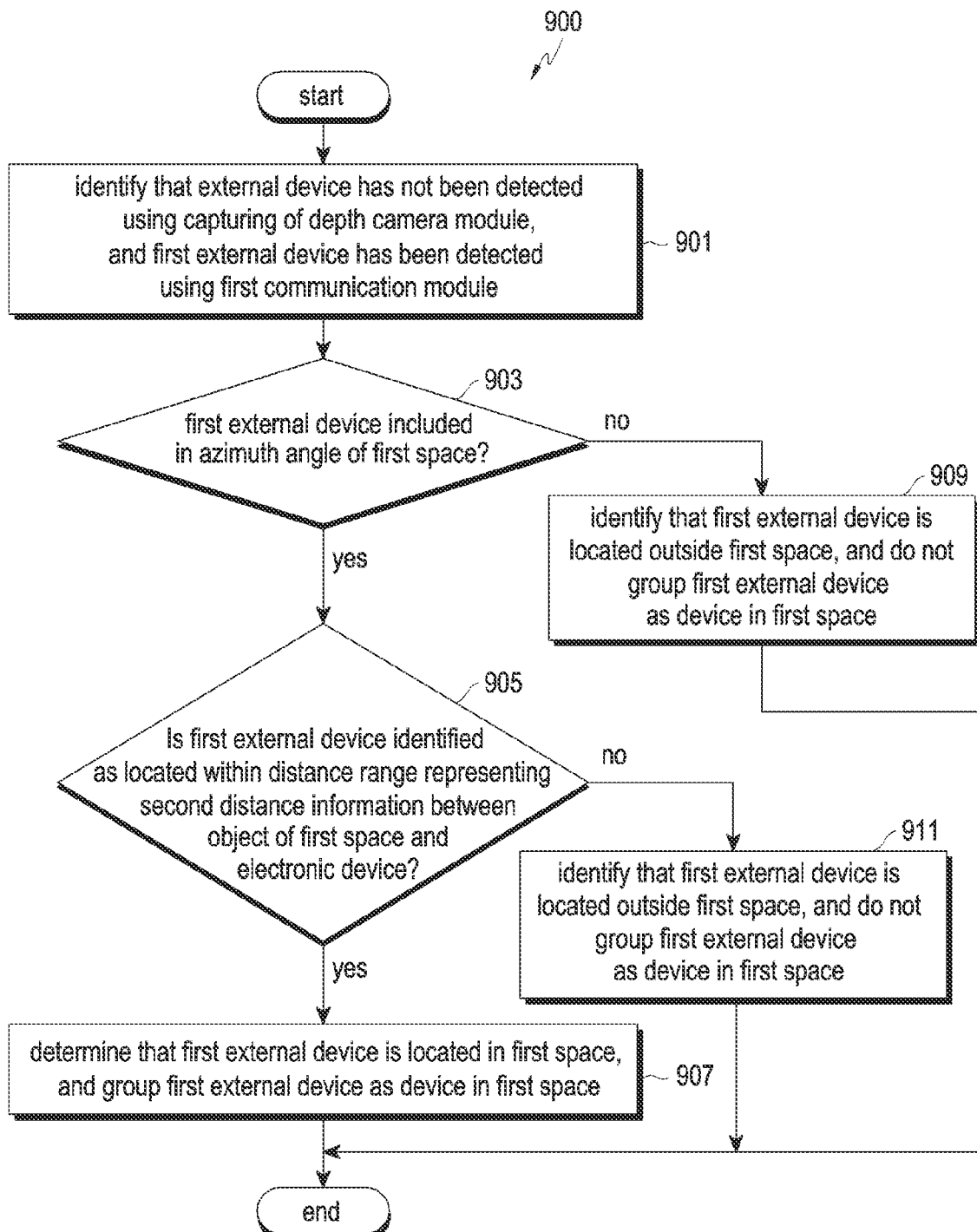
FIG. 9 is a flowchart illustrating an operation of grouping external devices by space in an electronic device according to various embodiments.

FIG. 9 is a flowchart 900 illustrating an operation of grouping external devices by space in an electronic device according to various embodiments. The operation of grouping external devices by space may include operations 901 to 911. According to an embodiment, at least one of operations 901 to 911 may be omitted, the order of some operations may be changed, or another operation may be added.

In operation 901, the electronic device (e.g., the electronic device 101 of FIG. 1, the electronic device 201 of FIG. 2, or the electronic device 301 of FIGS. 3a and 3b) may identify that an external device has not been detected using capturing of a depth camera module (e.g., the depth camera module 280 of FIG. 2), and a first external device has been detected using a first communication module (e.g., the first communication module 293 of FIG. 1).

According to an embodiment, the electronic device may identify that although a first space has been captured using the depth camera module, an external device located in the first space has not been detected based on capturing of the external device.

According to an embodiment, the electronic device may obtain distance information and direction information about the first external device based on a scan operation using the first communication module.

In operation 903, the electronic device (e.g., the electronic device 101 of FIG. 1, the electronic device 201 of FIG. 2, or the electronic device 301 of FIGS. 3a and 3b) may identify whether the first external device is included within the azimuth angle range of the first space.

According to an embodiment, while capturing the first space using the depth camera module, the electronic device may obtain the azimuth angle range (e.g., 0 θ to 150 θ) of the first space, including a capturing direction of the electronic device toward the first space from the direction of magnetic north to using a sensor module (e.g., the sensor module 276 of FIG. 2). The electronic device may obtain the azimuth angle θ of the first external device by converting a first coordinate system (e.g., a Cartesian coordinate system (x, y, z)) representing location information about the first external device to a second coordinate system (e.g., a spherical coordinate system (r, θ, Φ)) by <Equation 1> described above. The electronic device may identify whether the azimuth angle θ of the first external device is included in the azimuth angle range (e.g. 0 θ to 150 θ) of the first space by comparing the azimuth angle θ of the first external device with the azimuth angle range (e.g., 0 θ to 150 θ) of the first space.

When identifying that the first external device is included within the azimuth angle range of the first space in operation 903, the electronic device (e.g., the electronic device 101 of FIG. 1, the electronic device 201 of FIG. 2, or the electronic device 301 of FIGS. 3a and 3b) may identify whether the first external device is located within a distance range representing first distance information between an object (e.g., wall) of the first space and the electronic device in operation 905.

According to an embodiment, the electronic device may obtain the first distance information (e.g., r=100) between the object (e.g., wall) of the first space and the electronic device, using a depth camera module that captures the first space.

According to an embodiment, the electronic device may identify whether the first external device is located within the distance range representing the first distance information based on the first distance information and distance information about the first external device obtained using the first communication module.

When identifying that the electronic device is located within the distance range representing the first distance information between the object of the first space and the electronic device in operation 905, the electronic device (e.g., the electronic device 101 of FIG. 1, the electronic device 201 of FIG. 2, or the electronic device 301 of FIGS. 3a and 3b) may determine that the first external device is located in the first space, and group the first external device as a device in the first space in operation 907.

According to an embodiment, the electronic device may recognize the first external device located within the azimuth angle range of the first space and the distance range representing the first distance information as an external device which is hidden by another object and thus not detected through capturing of the depth camera module, although it is located in the first space.

According to an embodiment, the electronic device may group a first external device (e.g., external device 5), which is detected using the first communication module, is hidden by another object, and thus not captured by the depth camera module among a plurality of external devices included in the device table, although it is located in the first space, as a device of the first space based on the device table stored in the memory (e.g., the memory 230 of FIG. 2).

When identifying that the first external device is not included within the azimuth angle range of the first space in operation 903, the electronic device (e.g., the electronic device 101 of FIG. 1, the electronic device 201 of FIG. 2, or the electronic device 301 of FIGS. 3a and 3b) may not group the first external device as a device in the first space, determining that the first external device is located outside the first space in operation 909.

According to an embodiment, the electronic device may recognize the first external device detected using the first communication module, which is not located within the azimuth angle range of the first space, as an external device in a left or right space divided from the first space by the object (e.g., wall).

According to an embodiment, the electronic device may not group a first external device (e.g., external device 7) located in a right space divided from the first space by a wall, which has been detected using the first communication module among the plurality of external devices included in the device table stored in the memory (e.g., the memory 230 of FIG. 2), as a device in the first space based on the device table.

When identifying that the first external device is not located within the distance range representing the first distance information between the object of the space and the electronic device in operation 905, the electronic device (e.g., the electronic device 101 of FIG. 1, the electronic device 201 of FIG. 2, or the electronic device 301 of FIGS. 3a and 3b) may not group the first external device as a device in the first space, determining that the first external device is located outside the first space in operation 911.

According to an embodiment, the electronic device may recognize the first external device not located within the distance range representing the first distance information between the object of the first space and the electronic device, which has been detected using the first communication module, as an external device located in a rear space divided from the first space by the object (e.g. wall).

According to an embodiment, the electronic device may not group the first external device (e.g., external device 8) detected using the first communication module, which is located in the rear space divided from the first space by the object (e.g. wall) among the plurality of external devices included in the device table stored in the memory (e.g., the memory 230 of FIG. 2), as a device in the first space based on the device table.

Figure 10A:
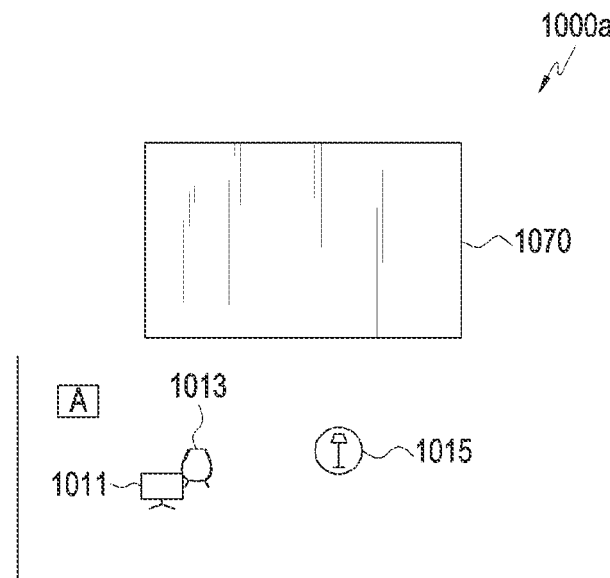
FIGS. 10a, 10b, and 10c are diagrams referred to for describing an operation of determining whether to group a first external device detected using a first communication module, when external devices are grouped by space in an electronic device according to various embodiments.
Figure 10B:
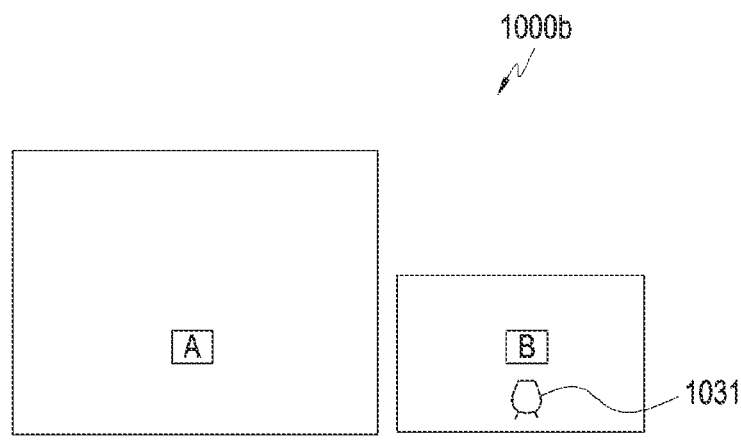
Figure 10C:
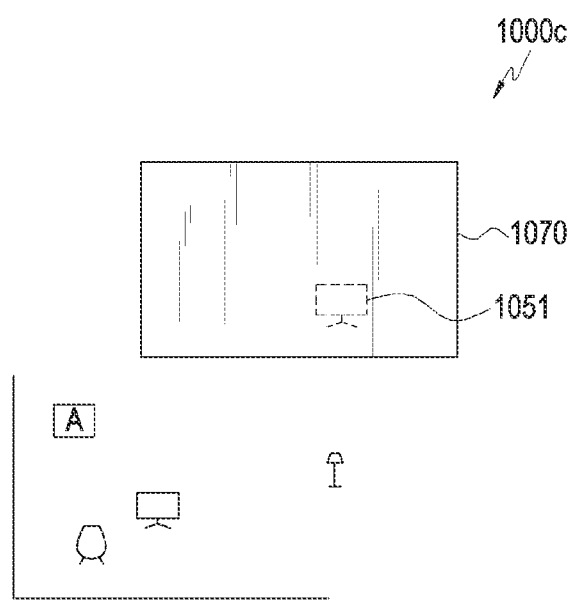

FIGS. 10a, 10b, and 10c are diagrams 1000a, 1000b, and 1000c referred to for describing an operation of determining whether to group a first external device detected using a first communication module, when external devices are grouped by space in an electronic device according to various embodiments.

As illustrated in FIG. 10a, although a plurality of external devices 1011, 1013, and 1015 are located in a first space A, the external device 1013 is hidden by another external device 1011 and thus may not be captured using a depth camera module (e.g., the depth camera module 280 of FIG. 2) that captures the first space A.

When identifying that a first external device detected using a first communication module (e.g., the first communication module 291 of FIG. 2) is located within the azimuth angle range of the first space A and a distance range representing first distance information between an object (e.g., wall) 1070 of the first space A1 and an electronic device (e.g., the electronic device 101 of FIG. 1, the electronic device 201 of FIG. 2, or the electronic device 301 of FIGS. 3a and 3b), the electronic device may recognize the first external device as the external device 1013 which is hidden by another object and thus has not been captured using the depth camera module, although it is located in the first space A1, and group the external device 1013 as a device in the first space A1.

As illustrated in FIG. 10b, when a first external device which has been detected using a first communication module (e.g., the first communication module 291 of FIG. 2) without being captured using a depth camera module 280 (e.g., the depth camera module 280 of FIG. 2) that captures a first space A is located outside the azimuth angle range of the first space A, an electronic device (e.g., the electronic device 101 of FIG. 1, the electronic device 201 of FIG. 2, or the electronic device 301 of FIGS. 3a and 3b) may recognize the first external device as an external device 1031 located in a right space B divided from the first space A by an object (e.g., wall). The electronic device may group the external device 1031 as a device in the space B.

As illustrated in FIG. 10c, when a first external device which has been detected using a first communication module (e.g., the first communication module 291 of FIG. 2) without being captured using a depth camera module (e.g., the depth camera module 280 of FIG. 2) that captures a first space A is not identified within a distance range representing first distance information between an object 1070 of the first space A and an electronic device (e.g., the electronic device 101 of FIG. 1, the electronic device 201 of FIG. 2, or the electronic device 301 of FIGS. 3a and 3b), the electronic device may recognize the first external device as an external device 1051 located in a rear space divided from the first space A by the object (e.g., wall).

According to various embodiments, a method of grouping external devices by space in an electronic device may include obtaining distance information and direction information about a first external device using a first communication module of the electronic device, obtaining first distance information between an object of a first space, which divides the first space from another space, and the electronic device using the depth camera module, and when it is identified that the first external device is located within a distance range representing the first distance information based on the distance information and the direction information about the first external device and the first distance information, identifying that the first external device is located in the first space, and grouping the first external device as a device in the first space.

According to various embodiments, the method may further include, when it is identified that the first external device is not located within the distance range representing the first distance information based on the distance information and the direction information about the first external device and the first distance information, identifying that the first external device is located outside the first space and not grouping the first external device as a device in the first space.

According to various embodiments, the method may further include calculating the distance information and the direction information about the first external device based on a signal transmitted to and received from the first external device through the first communication module.

According to various embodiments, the method may further include, when location information about an external device obtained using the depth camera module capturing the first space is identical to location information about the first external device obtained using the first communication module, identifying that the first external device is located in the first space, and grouping the first external device as a device in the first space.

According to various embodiments, the method may further include obtaining the location information about the external device in a second coordinate system using the depth camera module, obtaining the location information about the first external device in a first coordinate system using the first communication module, and identifying whether the location information about the external device is identical to the location information about the first external device by converting the location information about the first external device obtained in the first coordinate system into the second coordinate system.

According to various embodiments, the method may further include, when an external device is detected using the depth camera module capturing the first space, and the first external device is not detected using the first communication module, identifying that the external device detected using the depth camera module is located in the first space, and grouping the first electronic device as a device in the first space, according to a user selection.

According to various embodiments, the method may further include, when the first external device is detected using the first communication module, and an external device is not detected using the depth camera module capturing the first space, if it is identified that the first external device is located within an azimuth angle range of the first space and the distance range representing the first distance information, identifying that the first external device is located in the first space, and grouping the first external device as a device in the first space.

According to various embodiments, the method may further include obtaining an azimuth angle range of the first space using a sensor module of the electronic device.

According to various embodiments, the method may further include obtaining location information about the external device in a second coordinate system using the depth camera module, obtaining location information about the first external device in a first coordinate system using the first communication module,
  converting the location information about the first external device obtained in the first coordinate system into the second coordinate system, obtaining an azimuth angle of the first external device from the location information about the first external device converted into the second coordinate system, and identifying whether the first external device is located within an azimuth angle range of the first space based on the azimuth angle of the first external device and the azimuth angle range of the first space.

According to various embodiments, the method may further include, when it is identified that the first external device is not included within the azimuth angle range of the first space or not located within the distance range representing the first distance information, identifying that the first external device is located outside the first space.

The electronic device according to various embodiments may be one of various types of electronic devices. The electronic devices may include, for example, a portable communication device (e.g., a smartphone), a computer device, a portable multimedia device, a portable medical device, a camera, a wearable device, a movable device such as a robot cleaner, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B. or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   communication circuitry;
   a depth camera;
   at least one processor; and
   memory storing instructions that, when executed by the at least one processor individually or collectively, cause the electronic device to:
   obtain distance information and direction information about a first external device disposed in a first room defining a first space of an enclosed area using the communication circuitry, and obtain first distance information between the electronic device and an object separating the first room from a second room defining another space of the enclosed area, wherein the first distance information indicates a distance range between the object and the electronic device using the depth camera, the object separating the first room from the second room, and
   when identifying that the first external device is located within the distance range between the object and the electronic device representing the first distance information based on the distance information and the direction information about the first external device and the first distance information, the electronic device identifies that the first external device is located in the first room defining the first space, and groups the first external device as a device in the first room.

2. The electronic device of claim 1, wherein the instructions, when executed by the at least one processor individually or collectively, cause the electronic device to:
   when identifying that the first external device is not located within the distance range representing the first distance information based on the distance information and the direction information about the first external device and the first distance information, identify that the first external device is located outside the first room defining the first space and not group the first external device as a device in the first room.

3. The electronic device of claim 1, wherein the instructions, when executed by the at least one processor individually or collectively, cause the electronic device to:
   when location information about a second external device obtained using the depth camera capturing the first room defining the first space is identical to location information about the first external device obtained using the communication circuitry, identify that the first external device is located in the first room, and group the first external device as a device in the first room.

4. The electronic device of claim 3, wherein the instructions, when executed by the at least one processor individually or collectively, cause the electronic device to:
   obtain the location information about the second external device in a second coordinate system using the depth camera,
   obtain the location information about the first external device in a first coordinate system using the communication circuitry, and
   identify whether the location information about the second external device is identical to the location information about the first external device by converting the location information about the first external device obtained in the first coordinate system into the second coordinate system.

5. The electronic device of claim 1, wherein the instructions, when executed by the at least one processor individually or collectively, cause the electronic device to:
   when a second external device is detected using the depth camera capturing the first room defining the first space, and the first external device is not detected using the communication circuitry, identify that the second external device detected using the depth camera is located in the first room and group the first electronic device as a device in the first room, according to a user selection.

6. The electronic device of claim 1, wherein the instructions, when executed by the at least one processor individually or collectively, cause the electronic device to:
   when the first external device is detected using the communication circuitry, and a second external device is not detected using the depth camera capturing the first room defining the first space, if identifying that the first external device is located within an azimuth angle range of the first room and the distance range representing the first distance information, identify that the first external device is located in the first room, and group the first external device as a device in the first room.

7. The electronic device of claim 6, wherein the instructions, when executed by the at least one processor individually or collectively, cause the electronic device to:
   obtain location information about the second external device in a second coordinate system using the depth camera,
   obtain location information about the first external device in a first coordinate system using the communication circuitry,
   convert the location information about the first external device obtained in the first coordinate system into the second coordinate system, and obtain an azimuth angle of the first external device from the location information about the first external device converted into the second coordinate system, and
   identify whether the first external device is located within an azimuth angle range of the first room defining the first space based on the azimuth angle of the first external device and the azimuth angle range of the first room.

8. The electronic device of claim 6, wherein the instructions, when executed by the at least one processor individually or collectively, cause the electronic device to:
when identifying that the first external device is not included within the azimuth angle range of the first room defining the first space or not located within the distance range representing the first distance information, identify that the first external device is located outside the first room.

9. A method of grouping external devices by space in an electronic device, the method comprising:
obtaining distance information and direction information about a first external device using communication circuitry of the electronic device, and obtain first distance information between an object and the electronic device using a depth camera of the electronic device, wherein the first distance information indicates a distance range between the electronic device and the object of a first room defining a first space of an enclosed area, the object dividing the first room from a second room defining another space of the enclosed area; and
when it is identified that the first external device is located within athe distance range between the object and the electronic device representing the first distance information based on the distance information and the direction information about the first external device and the first distance information, identifying using the electronic device that the first external device is located in the first room defining the first space, and grouping the first external device as a device in the first room.

10. The method of claim 9, further comprising, when location information about an other external device obtained using the depth camera capturing the first room defining the first space is identical to location information about the first external device obtained using the communication circuitry, identifying that the first external device is located in the first room, and grouping the first external device as a device in the first room.

11. The method of claim 10, further comprising:
obtaining the location information about the external device in a second coordinate system using the depth camera;
obtaining the location information about the first external device in a first coordinate system using the communication circuitry; and
identifying whether the location information about the other external device is identical to the location information about the first external device by converting the location information about the first external device obtained in the first coordinate system into the second coordinate system.

12. The method of claim 9, further comprising, when an external device is detected using the depth camera capturing the first room defining the first space, and the first external device is not detected using the communication circuitry, identifying that the other external device detected using the depth camera is located in the first room and grouping the first electronic device as a device in the first room, according to a user selection.

13. The method of claim 9, further comprising, when the first external device is detected using the communication circuitry, and an other external device is not detected using the depth camera capturing the first room defining the first space, if it is identified that the first external device is located within an azimuth angle range of the first room defining the first space and the distance range representing the first distance information, identifying that the first external device is located in the first room, and grouping the first external device as a device in the first room.

14. The method of claim 13, further comprising:
obtaining location information about the other external device in a second coordinate system using the depth camera;
obtaining location information about the first external device in a first coordinate system using the communication circuitry;
converting the location information about the first external device obtained in the first coordinate system into the second coordinate system, and obtaining an azimuth angle of the first external device from the location information about the first external device converted into the second coordinate system; and
identifying whether the first external device is located within an azimuth angle range of the first room defining the first space based on the azimuth angle of the first external device and the azimuth angle range of the first room.

15. The method of claim 13, further comprising, when it is identified that the first external device is not included within the azimuth angle range of the first room defining the first space or not located within the distance range representing the first distance information, identifying that the first external device is located outside the first room.

16. An electronic device comprising:
a depth camera configured to capture an image of at least one object, and in response to capturing the at least one object the depth camera is configured to determine distance information $r_b$ between the at least one object and the electronic device;
communication circuitry configured to wirelessly communicate with an external device located a distance away from the electronic device; and
at least one processor; and
memory storing instructions that, when executed by the at least one processor individually or collectively, cause the electronic device to:
exchange wireless data with at least one external device disposed in a first room defining a first space of an enclosed area using the communication circuitry,
identify first distance information between the at least one external device and the electronic device based on the wireless data;
obtain second distance information indicating a distance range between the electronic device and a captured object among the at least one object defining the first room, the captured object dividing the first room from a second room defining another space of the enclosed area;
in response to identifying that the first distance information indicates that the at least one external device is located within the distance range indicated by the second distance information, identify that the at least one external device is located in the first room; and
grouping the at least one external device as at least one device in the first room.

17. The electronic device of claim 16, wherein the instructions, when executed by the at least one processor individually or collectively, cause the electronic device to:
performs a time of flight (ToF) analysis on the captured object to identify the second distance.

18. The electronic device of claim 16, wherein the instructions, when executed by the at least one processor individually or collectively, cause the electronic device to:
performs a light detection and ranging (LiDar) analysis on the captured object to identify the second distance.

19. The electronic device of claim 16, further comprising a sensor configured to identify an azimuth angle range of the at least one object and an azimuth angle of the at least one external device.

20. The electronic device of claim 19, wherein the instructions, when executed by the at least one processor individually or collectively, cause the electronic device to:
identify the second distance information based on a comparison between the azimuth angle of the at least one external device and the azimuth angle range of the at least one device.

* * * * *